United States Patent [19]

Stojanovski

[11] Patent Number: 4,640,159
[45] Date of Patent: Feb. 3, 1987

[54] TOOL HOLDER WITH PLURALITY OF CUTTING INSERTS

[76] Inventor: Stojan Stojanovski, 1950 Birchwood, Troy, Mich. 48084

[21] Appl. No.: 800,798

[22] Filed: Nov. 22, 1985

[51] Int. Cl.$^4$ .............................................. B23B 29/30
[52] U.S. Cl. ...................................... 82/36 A; 74/826
[58] Field of Search ................... 82/36 A; 407/67, 83, 407/89; 408/713; 74/826

[56] References Cited

U.S. PATENT DOCUMENTS

| | | | |
|---|---|---|---|
| 3,145,600 | 8/1964 | Sweet | 407/67 |
| 3,498,653 | 3/1970 | McCreery | 82/36 A |
| 4,293,252 | 10/1981 | Kress et al. | 408/713 |

FOREIGN PATENT DOCUMENTS

| | | | |
|---|---|---|---|
| 127289 | 10/1945 | Australia | 82/36 A |
| 1249497 | 11/1960 | France | 407/89 |
| 411472 | 8/1945 | Italy | 407/67 |
| 213104 | 3/1924 | United Kingdom | 82/36 A |

*Primary Examiner*—Leonidas Vlachos
*Attorney, Agent, or Firm*—Charles W. Chandler

[57] ABSTRACT

A tool holder having a head with four pockets, each for supporting an indexible insert. Each insert is mounted on the head such that it can be indexed to reposition a plurality of cutting edges on the insert. The head has a shank rotatably mounted in a body supported on a machine, such as a lathe. A handle connected to the shank is used to replace an insert in a cutting position with another insert merely by rotating the head and without repositioning the body.

7 Claims, 10 Drawing Figures

TOOL HOLDER WITH PLURALITY OF CUTTING INSERTS

BACKGROUND OF THE INVENTION

This invention is related to tool holders for indexible cutting inserts, and more particularly to a tool holder having a shank mounted in a body with a plurality of removable inserts disposed such that when mounted on the tool post of a lathe, the user can move any of the inserts into a cutting engagement with the workpiece by rotating the shank.

Indexible inserts are commonly employed for metal forming operations. Indexible inserts have several cutting edges so that by repositioning the insert in a pocket in the tool holder, a series of cutting edges can be successively disposed in a cutting position. However, the insert must be removed from the pocket and replaced with another insert to provide a different cutting or finishing action. Thus, if a workpiece is to be successively cut with different inserts, such as a roughing insert, and then with a facing or finishing insert, either the insert must be replaced in the tool holder, or the tool holder and insert replaced with another tool holder.

Some multiple tool holders are known in the prior art such as U.S. Pat. No. 3,513,733 which issued to J. Anania, June 11, 1968; U.S. Pat. No. 3,498,163 which issued to J. L. Jeanneret, Mar. 3, 1970; and U.S. Pat. No, 3,670,608 which issued to Otto Marzy, June 20, 1972.

SUMMARY OF THE INVENTION

The broad purpose of the present invention is to provide a tool holder having a shank mounted in a body which can be mounted in conventional, commercially-available lathe tool posts. The shank is rotatable with respect to the body, and has a handle at one end and a head at the opposite end. The head has four pockets, each adapted to receive an indexible insert. Each insert can be indexed in its respective pocket to present several cutting edges.

The inserts are mounted on the head such that by rotating the head with the handle, the user can replace a cutting insert in a cutting position on the lathe with another insert having either similar to different cutting edges, thus providing a quick method for changing inserts. For example, one insert might be adapted for a rough cut, and another insert adapted for a turning or facing cut.

Still further objects and advantages of the present invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 2:
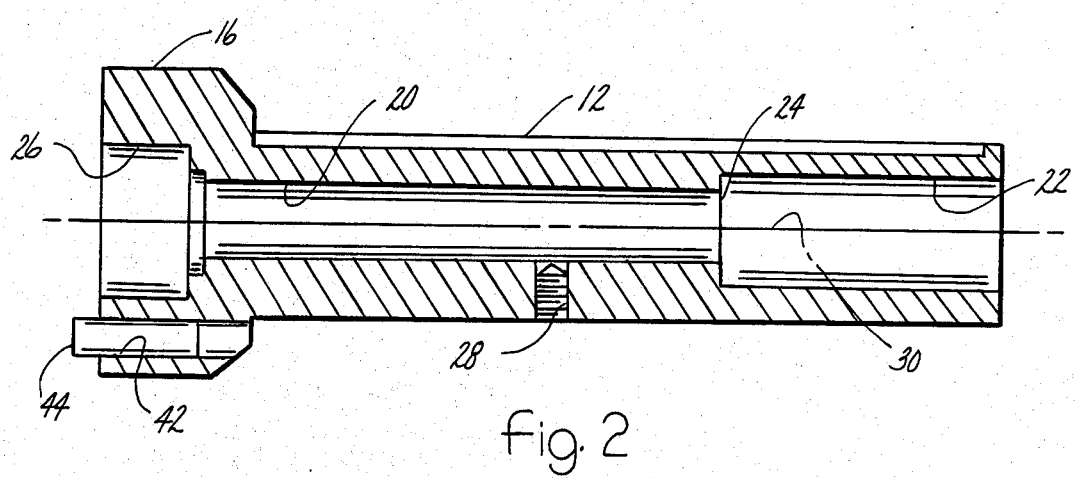
FIG. 2 is a longitudinal sectional view of the tool holder body.
Figure 3:
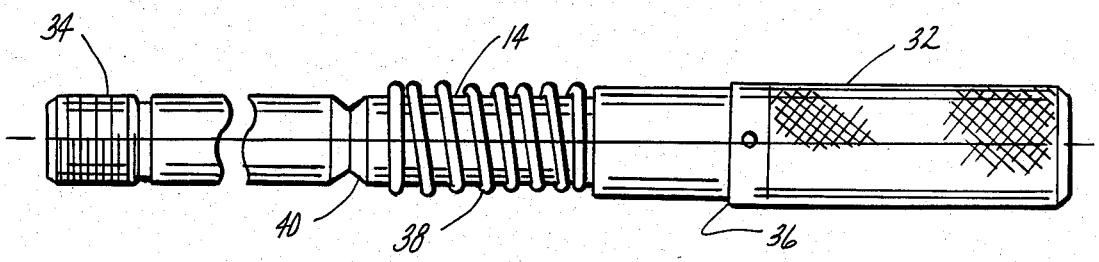
FIG. 3 is a view of the tool holder shank and return spring.
Figure 4:
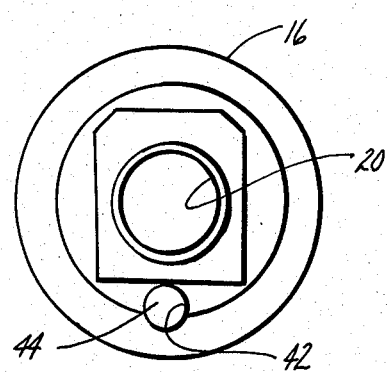
FIG. 4 is a view of the body as seen from the left side of FIG. 2.

Referring to the drawings, a preferred tool holder means 10 comprises a body 12 supporting an elongated shank 14. Body 12 preferrably has a square cross-section so that it can be mounted in the slot of a conventional tool post on the lathe (not shown). Referring to FIG. 2, body 12 has enlarged end 16 and a longitudinal bore 20 which terminates at one end with an enlarged opening 22 to define annular shoulder 24. The opposite end of bore 20 terminates in enlarged opening 26 in end 16. The body also has tapped opening 28 disposed along an axis at right angles to longitudinal axis 30 of the body.

Figure 1:
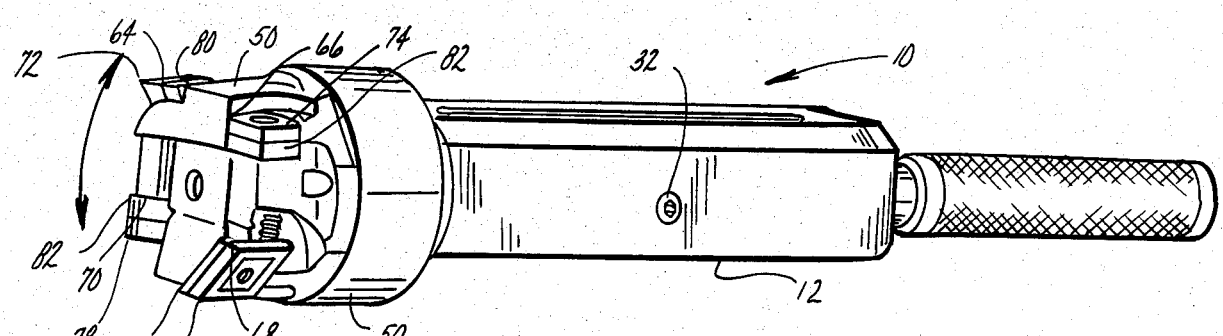
FIG. 1 is a perspective view of a tool holder illustrating the preferred embodiment of the invention.

Referring to FIG. 1, set screw 32 is received in tapped opening 28.

Shank 14 has a handle 32 at one end and a threaded end 34 at its opposite end. The shank has a shoulder 36 receivable in opening 22 of the body. A helical spring 38 is mounted on the shank and received in opening 22 so as to be compressed between shoulder 24 in the body and shoulder 36 on the shank. The spring biases handle 32 away from shoulder 24.

The shank also has an annular groove 40 which may be aligned with tapped opening 28. When groove 40 is aligned with opening 28, set screw 32 provides means for locking the shank against longitudinal motion with respect to body 12.

Enlarged end 16 has opening 42. Dowel 44 is mounted in opening 42.

Figure 6:
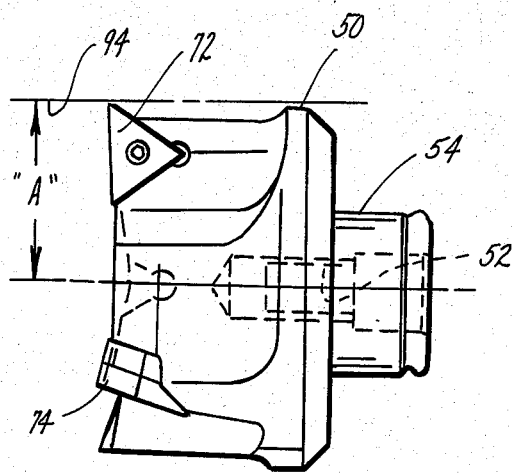
FIG. 6 is a view of the head showing a pair of inserts.
Figure 7:
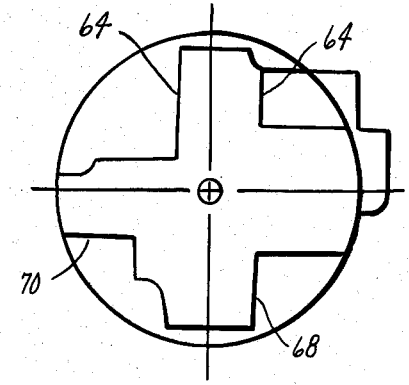
FIG. 7 is a view of the head with the inserts removed from their respective pockets.

Referring to FIG. 6, head 50 has threaded opening 52 for engaging threaded end 34 of the shank. The head has a boss 54 slidably receivable in opening 26 in the body.

Figure 5:
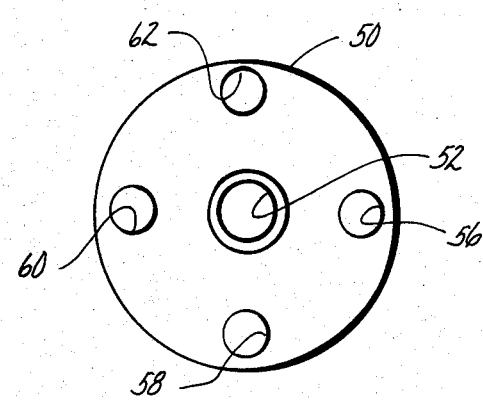
FIG. 5 is a view of the face of the head that mates with the shank.

Referring to FIG. 5, the head also has four locating openings 56, 58, 60 and 62, equi-angularly disposed about central, threaded opening 52 and adapted to receive the end of dowel 44 to lock the head in a selected position of four rotated positions with respect to the body. Thus, when the shank is mounted in the body, spring 38 biases the head toward the body so that the dowel slides against the rear surface of the head until it is aligned with a selected one of the four openings 56 to 62. The spring then snaps the head into abutment with the enlarged end 16 of the body as the dowel is received in the selected opening.

Figure 8:
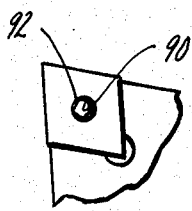
FIGS. 8-10 are views of different indexible inserts mounted on the head.
Figure 9:
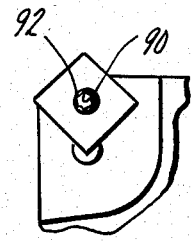
Figure 10:
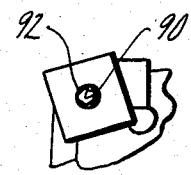

Referring to FIG. 1, the head has four tool-receiving pockets 64, 66, 68 and 70, disposed at 90 degree angle intervals about axis 30. Indexible inserte 72, 74, 76 and 78 are mounted in pockets 64, 66, 68 and 70, respectively. The inserts are mounted on spacers 80, 82, 84 and 86 respectively. The inserts are commercially available cutting tools, each having a central opening 90, as illustrated in FIG. 8, for receiving a set screw 92 in a tapped opening (not shown) in the head for attaching each insert in its respective pocket. Each pocket is formed with respect to its respective insert such that the insert can be indexed by loosening its mounting screw and rotating the insert to bring a different cutting edge into cutting position.

Referring to FIG. 6, insert 72 is illustrated with a cutting edge disposed for engaging workpiece 94. The position of the cutting edge is disposed a radial distance "A" from the axis of rotation of the shank which coincides with the longitudinal axis 30 of the body. Insert 74 is mounted in its pocket with a cutting ege disposed such that by rotating the shank with respect to the body, insert 74 is rotated so that its cutting edge engages the workpiece a distance "A" from the axis of rotation of the shank. The user can quickly dispose a second insert into a cutting position by merely rotating the shank with respect to the body, and without any further adjustment of the insert. The first insert, for example, can be used for a rough cut and the second insert for a facing cut, or the inserts can be identical, in two separate pockets, so that the user can replace an insert having worn cutting edges for an insert having sharp cutting edges.

Thus, the tool can be used, for example, for locking four different inserts on a single head with means for quickly changing one insert for another. Each insert is removable from the head so that the user can replace an insert without removing the holder from the tool post. The body is adapted to be received in a conventionally shaped tool post. The head can also be mounted on a lathe to function as a boring tool with a replacable cutting insert.

Having described my invention, I claim:

1. A combination comprising:
   an elongated body having a longitudinal opening;
   a shank disposed in the longitudinal opening of the body for rotatable and longitudinal motion, the shank having a first end adjacent one end of the body and a second end adjacent the opposite end of the body;
   handle means carried on the first end of the shank for rotating same between a first rotated position and a second rotated position, and for moving same between longitudinally spaced positions along a generally linear path of motion, including a locking position and a release position;
   tool holder means including a head carried on the second end of the shank so as to be movable therewith between said locking position and said release position;
   a first cutting insert and a second cutting insert mounted on the head such that the first insert is disposed in a cutting position in said first rotated position, and the second insert is disposed in said cutting position when the first insert is disposed in said second rotated position;
   interengagable pin and socket means carried on the head and the body, including a socket and a pin member received in the socket as the handle means is moved to said locking position, to block the head against rotation with respect to the body, the pin being removable from the socket as the handle means is moved to said release position, to permit rotation of the head with respect to the body; and
   bias means carried between the shank and the body to bias the shank towards said locking position with respect to the body, whereby the user can exchange the first insert with the second insert by pushing the handle in a linear motion to release the head, rotating the head and the releasing the handle as the pin is received in said socket.

2. A combination as defined in claim 1, in which the first cutting edge of the second insert has a different cutting configuration than the first cutting edge of the first insert.

3. A combination as defined in claim 1, in which the first cutting edge of the second insert has an identical cutting configuration to the cutting configuration of the first cutting edge of the first insert.

4. A combination as defined in claim 1, in which the tool holder means includes a first pocket; the first cutting insert is disposed in the first pocket and has a first cutting edge disposed beyond the first pocket in said cutting position, the first insert has a second cutting edge disposed such that the first insert can be indexed in the first pocket to dispose the second cutting edge in said cutting position.

5. A combination as defined in claim 4, in which the tool holder means has a second pocket, and including a second cutting insert disposed in the second pocket and having a first cutting edge disposed beyond the second pocket, the second cutting insert having a second cutting edge disposed such that the second insert can be indexed in the second pocket to position the second cutting edge in the previous position of the first cutting edge.

6. A combination as defined in claim 4, including fastener means on the tool holder for connecting the second insert on the tool holder means such that the second insert may be indexed in the second pocket ot exchange the position of the first and the second cutting edges thereof.

7. A combination as defined in claim 4, in which the pin and socket means includes a plurality of sockets and in which the pin is receivable in a selected socket depending upon the insert disposed in said cutting position.

* * * * *